United States Patent
Shiosaka (10) Patent No.: US 11,999,428 B2
(45) Date of Patent: Jun. 4, 2024

(54) SIDE CASE ATTACHMENT STRUCTURE

(71) Applicant: SUZUKI MOTOR CORPORATION, Hamamatsu (JP)

(72) Inventor: Taku Shiosaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 104 days.

(21) Appl. No.: 17/946,530

(22) Filed: Sep. 16, 2022

(65) Prior Publication Data

US 2023/0090359 A1    Mar. 23, 2023

(30) Foreign Application Priority Data

Sep. 22, 2021   (JP) .................................. 2021-154129

(51) Int. Cl.
*B62J 7/04*   (2006.01)
*B62J 9/27*   (2020.01)

(52) U.S. Cl.
CPC .. *B62J 7/04* (2013.01); *B62J 9/27* (2020.02)

(58) Field of Classification Search
CPC ......... B62J 9/26; B62J 9/24; B62J 9/23; B62J 9/27; B62J 7/04; B62K 19/46; B62K 19/40
See application file for complete search history.

(56) References Cited

U.S. PATENT DOCUMENTS

| | | | | |
|---|---|---|---|---|
| 11,794,839 | B2 * | 10/2023 | Golling | B62J 7/04 |
| 2005/0150921 | A1 * | 7/2005 | Schneider | B62J 9/26 |
| | | | | 224/413 |
| 2017/0008585 | A1 * | 1/2017 | Wada | B62J 9/24 |
| 2022/0234668 | A1 * | 7/2022 | Tamura | B62J 9/27 |

FOREIGN PATENT DOCUMENTS

EP     2289782 A2    3/2011
JP     2011-051438 A 3/2011

* cited by examiner

*Primary Examiner* — Corey N Skurdal
(74) *Attorney, Agent, or Firm* — Stein IP LLC (57) ABSTRACT

A side case attachment structure detachably attaching a side case to a vehicle body of a saddle-type vehicle includes a first attachment portion protruding of the side case, a second attachment portion of the side case, and a holding portion of a side portion of a rear portion of the vehicle body, the holding portion including a first hooking portion hooking the first attachment portion from above and a second hooking portion hooking the second attachment portion from above. A movement restricting portion of the holding portion restricts forward movement of the side case by coming into contact with the first attachment portion when a grip portion of the side case is gripped and the side case is pulled forward and upward with respect to the vehicle body so as to detach the first attachment portion from the first hooking portion.

7 Claims, 9 Drawing Sheets

SIDE CASE ATTACHMENT STRUCTURE

CROSS-REFERENCE TO RELATED APPLICATIONS

The disclosure of Japanese Patent Application No. 2021-154129 filed on Sep. 22, 2021, including specification, drawings and claims is incorporated herein by reference in its entirety.

BACKGROUND

The present invention relates to a side case attachment structure for attaching a side case to a saddle-type vehicle.

In order to increase a load amount on a saddle-type vehicle, one or both of left and right sides of a rear portion of the saddle-type vehicle may be attached with a side case. The side case is often attached to a seat rail or the like of a vehicle body of the saddle-type vehicle via a case holder or the like.

Some saddle-type vehicles include a side case attachment structure provided with a hook on a side surface of a side case facing a vehicle body, and provided with a case holder having a hole for hooking the hook on an outer side portion of a seat rail of the vehicle body. The hook is hooked in the hole of the case holder, so that the side case can be detachably attached to the vehicle body (see Patent Literature 1 below). The hook has a shape that projects laterally from the side surface of the side case and then bends downward. The hole provided in the case holder opens upward. Therefore, when the side case is to be attached to the vehicle body, a tip end of the hook is inserted into the hole of the case holder from above. When the side case is to be detached from the vehicle body, the entire side case is lifted to move the tip end of the hook upward, and the tip end of the hook is pulled out from the hole of the case holder.
Patent Literature 1: JP2011-51438A

SUMMARY OF INVENTION

The present invention provides a side case attachment structure configured to detachably attach a side case including a grip portion at an upper portion of the side case to a vehicle body of a saddle-type vehicle, the side case attachment structure including: a first attachment portion protruding toward the vehicle body from a portion of the side case that is rearward of a straight line passing through the grip portion and a center of gravity of the side case, the first attachment portion being bent or inclined such that a protruding end of the first attachment portion faces downward; a second attachment portion protruding toward the vehicle body from a portion of the side case that is forward of the straight line passing through the grip portion and the center of gravity of the side case, the second attachment portion being bent or inclined such that a protruding end of the second attachment portion faces downward; and a holding portion provided on a side portion of a rear portion of the vehicle body, the holding portion including a first hooking portion configured to hook the first attachment portion from above and a second hooking portion configured to hook the second attachment portion from above, the holding portion being configured to hold the side case on the vehicle body in a state where the side case is inclined such that the grip portion is positioned forward of the center of gravity of the side case by being configured to hook the first attachment portion and the second attachment portion on the first hooking portion and the second hooking portion, respectively. A part of the holding portion that is forward of the first hooking portion is provided with a movement restricting portion protruding above the first hooking portion, the movement restricting portion being configured to restrict forward movement of the side case by coming into contact with the first attachment portion when the grip portion is gripped and the side case held by the vehicle body is pulled forward and upward with respect to the vehicle body so as to detach the first attachment portion from the first hooking portion.

BRIEF DESCRIPTION OF DRAWINGS

FIGS. 1A and 1B are explanatory views showing a side case attachment structure according to an embodiment of the present invention, in which

FIGS. 3A and 3B are external views showing the side case according to the embodiment of the present invention, in which

FIGS. 4A and 4B are explanatory views showing a left rear portion of a vehicle body according to the embodiment of the present invention, in which

FIGS. 6A and 6B are explanatory views showing a cross section of the left rear portion of the vehicle body cut along a cutting line VI-VI in FIG. 4A and a state of a rear attachment portion of the side case in the embodiment of the present invention as viewed from the rear, in which

DESCRIPTION OF EMBODIMENTS

When a rear mounting component such as a grab bar or a rear carrier is mounted on an upper portion of the seat rail of the vehicle body, the rear mounting component may protrude laterally from the seat rail, and the protruding portion may be positioned above the side case attached to the vehicle body.

In the above-described side case attachment structure, when the side case is to be detached from the vehicle body, the entire side case is moved upward with respect to the vehicle body in order to remove the hook from the hole of the case holder. Therefore, when the rear mounting component laterally protrudes from the seat rail and is positioned above the side case attached to the vehicle body, an amount of moving the entire side case upward with respect to the vehicle body is limited, and it is difficult to detach the side case from the vehicle body.

It is considered that this problem can be solved by raising a mounting position of the rear mounting component on the vehicle body or lowering a mounting position of the side case on the vehicle body. However, a raised mounting position of the rear mounting component also raises a center of gravity of the vehicle body, and thus may lower traveling stability of the saddle-type vehicle. For example, a raised attachment position of the grab bar is raised often requires an accordingly raised position of a pinion seat. As a result, the traveling stability of the saddle-type vehicle may be lowered significantly. On the other hand, a lowered mounting position of the side case may result in difficulty in sufficiently securing an interval between the side case and a muffler. In this case, it is necessary to take measures for protecting the side case from heat of the muffler, which may increase a manufacturing cost of the saddle-type vehicle or the side case.

The present invention has been made in view of, for example, the above-described problems, and an object of the present invention is to provide a side case attachment structure capable of easily detaching a side case from a vehicle body, even in a case where a rear mounting component laterally protrudes from the vehicle body and the protruding portion is positioned above the side case attached to the vehicle body.

According to the present invention, it is possible to easily detach a side case from a vehicle body, even in a case where a rear mounting component laterally protrudes from the vehicle body and the protruding portion is positioned above the side case attached to the vehicle body.

A side case attachment structure according to an embodiment of the present invention is a side case attachment structure for detachably attaching a side case having a grip portion at an upper portion thereof to a vehicle body of a saddle-type vehicle.

The side case attachment structure of the present embodiment includes: a first attachment portion protruding toward the vehicle body from a portion of the side case that is rearward of a straight line passing through the grip portion and a center of gravity of the side case, the first attachment portion being bent or inclined such that a protruding end thereof faces downward; a second attachment portion protruding toward the vehicle body from a portion of the side case that is forward of the straight line passing through the grip portion and the center of gravity of the side case, the second attachment portion being bent or inclined such that a protruding end thereof faces downward; and a holding portion provided on a side portion of a rear portion of the vehicle body, the holding portion including a first hooking portion configured to hook the first attachment portion from above and a second hooking portion configured to hook the second attachment portion from above, the holding portion being configured to hook the first attachment portion and the second attachment portion on the first hooking portion and the second hooking portion, respectively, thereby holding the side case on the vehicle body in a state where the side case is inclined such that the grip portion is positioned forward of the center of gravity of the side case.

A part of the holding portion that is forward of the first hooking portion is provided with a movement restricting portion protruding above the first hooking portion. The movement restricting portion restricts forward movement of the side case held by coming into contact with the first attachment portion when the grip portion is gripped and the side case by the vehicle body is pulled forward and upward with respect to the vehicle body so as to detach the first attachment portion from the first hooking portion.

In the side case attachment structure of the present embodiment, in order to detach the side case from the vehicle body, the user grips the grip portion and pulls up the side case forward and upward. As a result, the first attachment portion is detached from the first hooking portion, and then the first attachment portion comes into contact with the movement restricting portion. Thereafter, the side case rotates rearward about a contact point between the first attachment portion and the movement restricting portion due to gravity. As a result of the rearward rotation, the second attachment portion is detached from the second hooking portion. In this way, the second attachment portion is automatically detached from the second hooking portion by the rearward rotation of the side case due to gravity, so that the user can easily detach the side case from the vehicle body.

According to the side case attachment structure of the present embodiment, when the side case is to be detached from the vehicle body, the side case is rotated rearward about the contact point between the first attachment portion and the movement restricting portion due to gravity so as to detach the second attachment portion from the second hooking portion. Therefore, the user can detach the side case from the vehicle body by simply moving the entire side case upward by a substantially minimum necessary amount for detaching the first attachment portion from the first hooking portion. Therefore, it is possible to easily detach the side case from the vehicle body, even in a case where the rear mounting component laterally protrudes from the vehicle body and is located above the portion of the side case held by the vehicle body where the first attachment portion is provided, which limits the amount of upward movement of the entire side case when the side case is to be detached from the vehicle body.

A side case attachment structure according to an embodiment of the present invention will be exemplified by a side case attachment structure for attaching a side case to a left side portion of a rear portion of a vehicle body of a saddle-type vehicle. In the present embodiment, the directions of front (Fd), rear (Bd), upper (Ud), lower (Dd), left (Ld), and right (Rd) follow the arrows drawn at the lower right in each drawing.

(Side Case Attachment Structure)

Figure 1A:
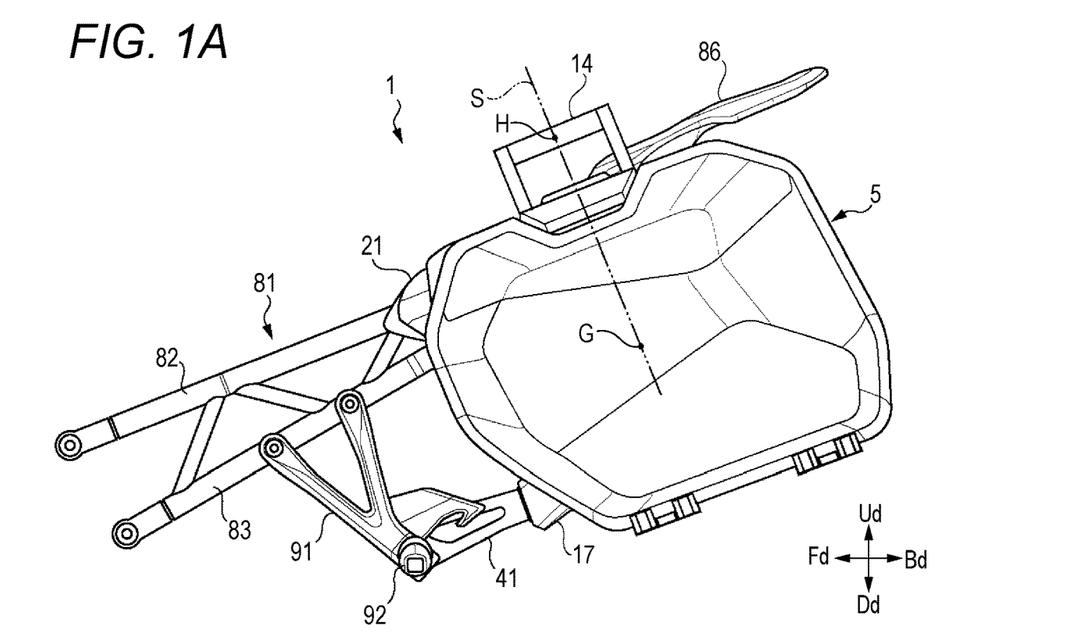
FIG. 1A shows a state of the side case attachment structure as viewed from the left.
Figure 1B:
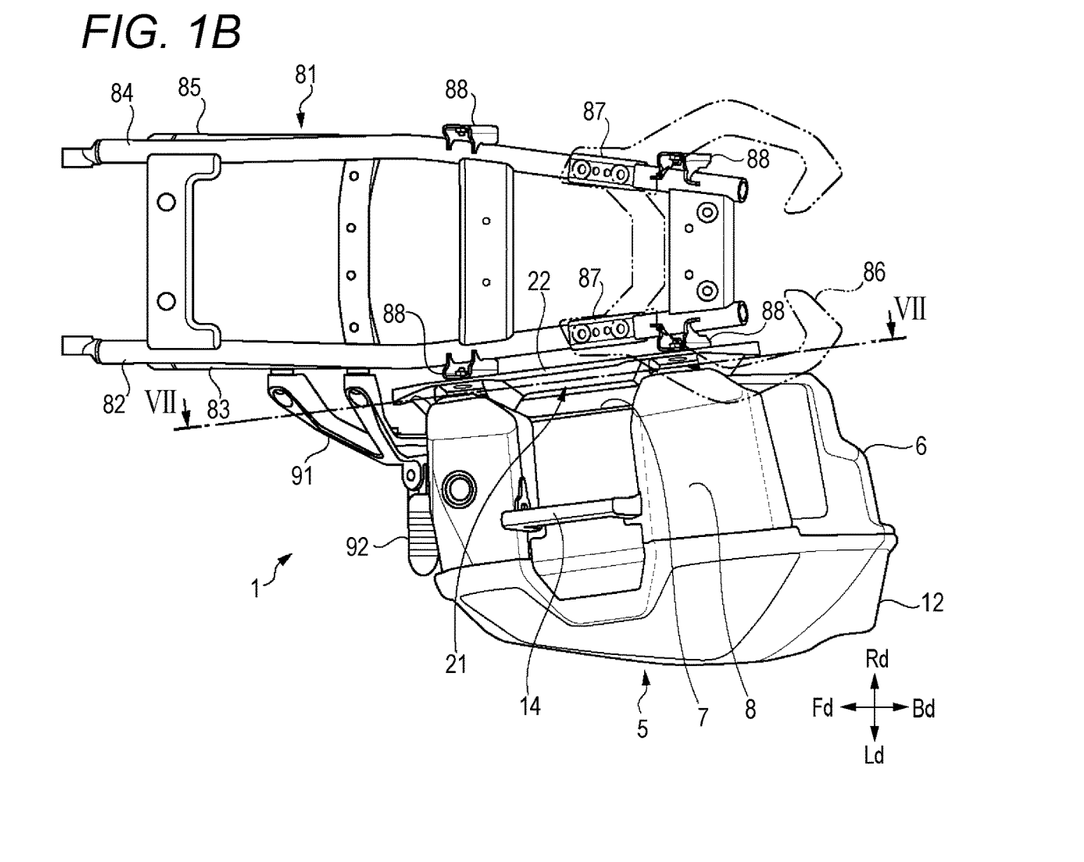
FIG. 1B shows a state of the side case attachment structure as viewed from above.

FIG. 1A shows a side case attachment structure 1 according to an embodiment of the present invention as viewed from the left. FIG. 1B shows the side case attachment structure 1 as viewed from above. In FIG. 1B, a grab bar 86 is only shown in outer shape by a two-dot chain line for convenience of illustration.

As illustrated in FIGS. 1A and 1B, the side case attachment structure 1 according to the embodiment of the present invention is an attachment structure for detachably attaching a side case 5 having a grip portion 14 at an upper portion thereof to a vehicle body 81 of a saddle-type vehicle. The side case attachment structure 1 includes: a front attachment portion 15, a rear attachment portion 16, a lower attachment portion 17, and the like (see FIGS. 2, 3A, and 3B) of the side case 5; a case holder 21 (see FIGS. 4A and 4B) provided to an upper left seat rail 82 and a lower left seat rail 83 of the vehicle body 81 and having a front hooking portion 23, a rear hooking portion 25, and the like; and a lower hooking portion 41 (see FIGS. 4A and 4B) provided to a pinion step holder 91 of the vehicle body 81.

The front attachment portion 15 is a specific example of a "second attachment portion", the rear attachment portion 16 is a specific example of a "first attachment portion", and the lower attachment portion 17 is a specific example of a "third attachment portion". The case holder 21 is a specific example of a "holding portion". The front hooking portion 23 is a specific example of a "second hooking portion", the rear hooking portion 25 is a specific example of a "first hooking portion", and the lower hooking portion 41 is a specific example of a "third hooking portion".

(Side Case)

Figure 2:
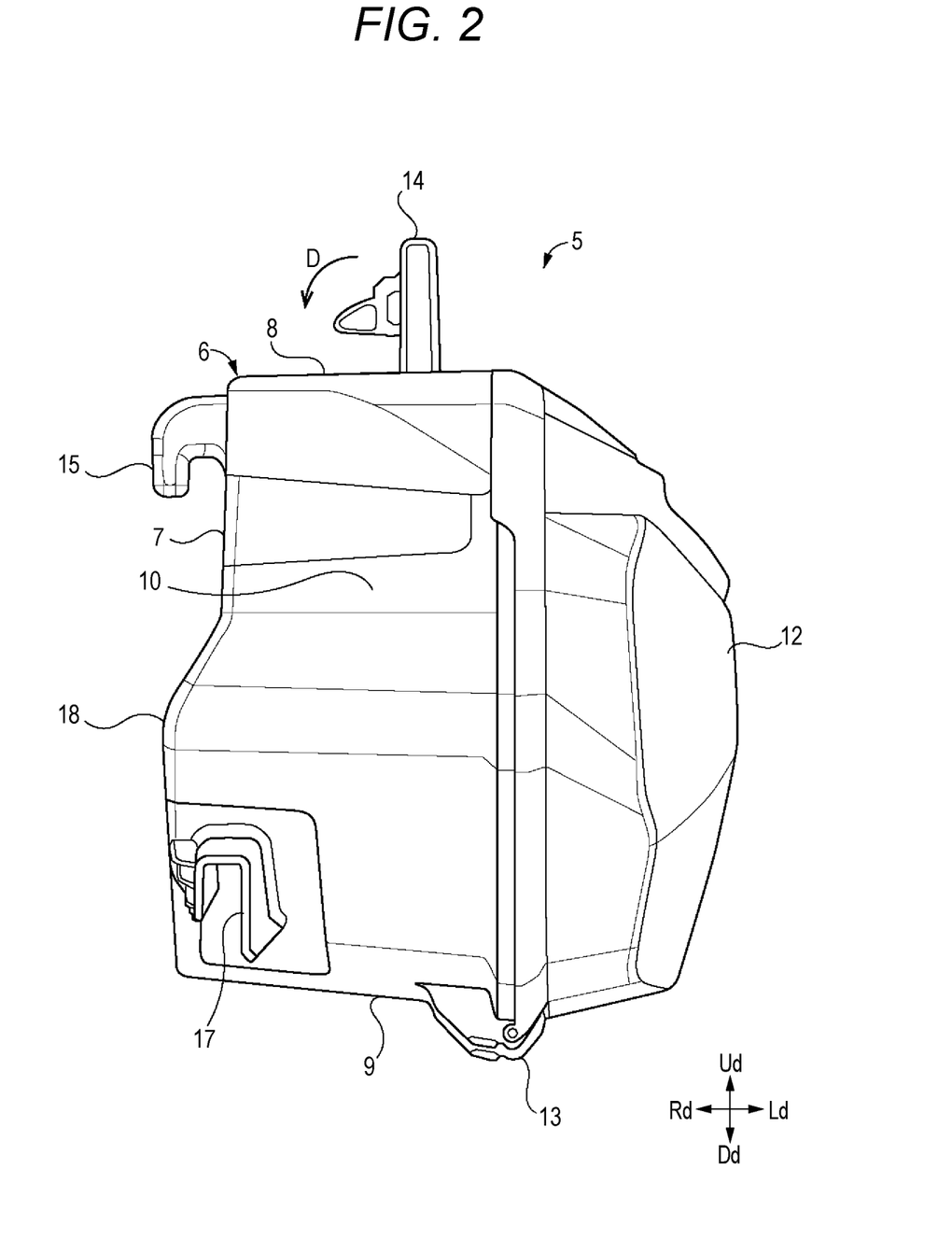
FIG. 2 is an external view of a side case according to the embodiment of the present invention as viewed from the front.
Figure 3A:
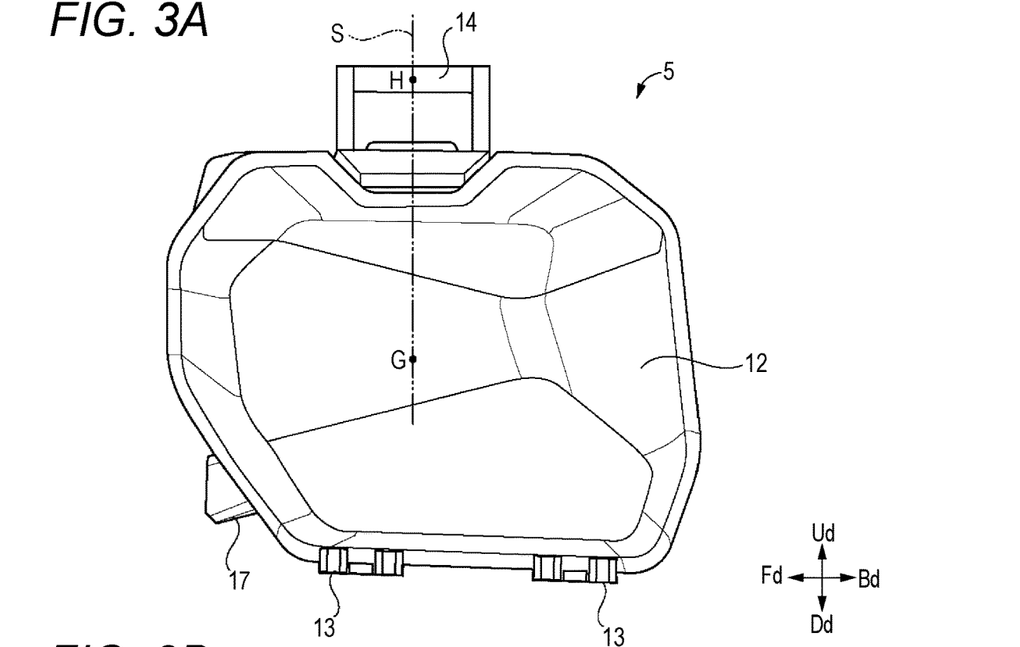
FIG. 3A shows a state of the side case as viewed the left.
Figure 3B:
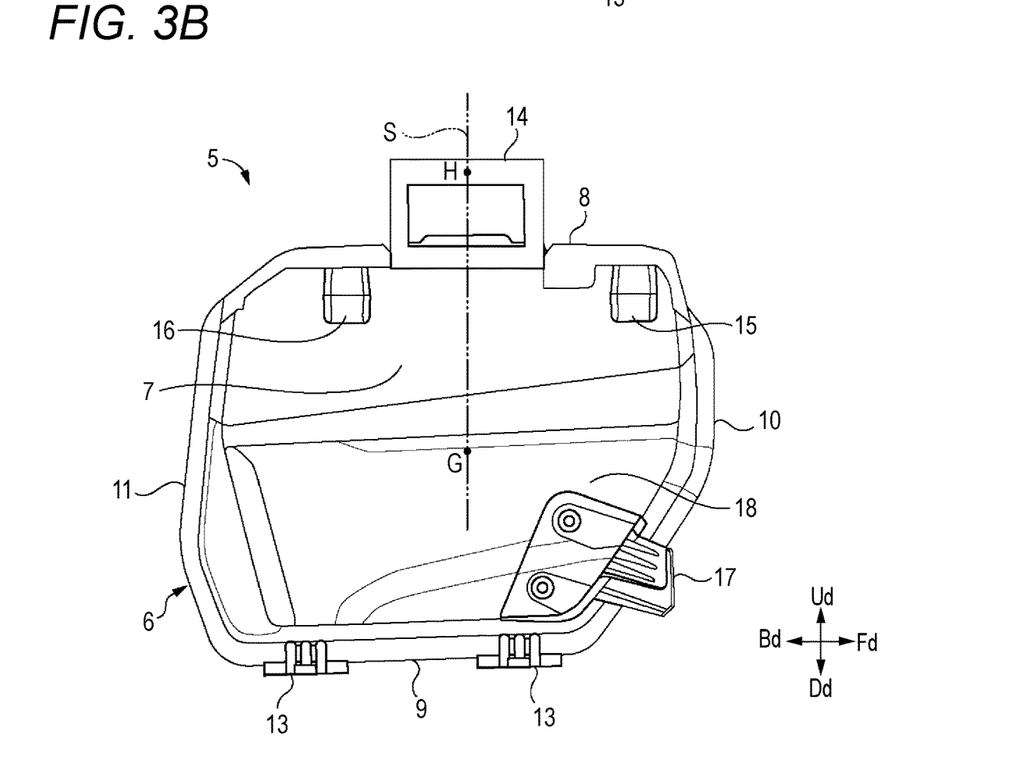
FIG. 3B shows a state of the side case as viewed from the right.

FIG. 2 shows a state of the side case 5 as viewed from the front. FIG. 3A shows a state of the side case 5 as viewed the left. FIG. 3B shows a state of the side case 5 as viewed from the right.

The side case 5 is a box-shaped case capable of accommodating an object therein, and is called, for example, a side pannier case or a side box. The side case 5 is formed of, for example, a resin material or a metal material such as aluminum. As shown in FIG. 2, the side case 5 includes a case body 6 and a lid 12. The lid 12 is openably and closably coupled to the case body 6 via a hinge portion 13.

As shown in FIG. 3B, the case body 6 includes an inner wall 7, an upper wall 8, a lower wall 9, a front wall 10, and a rear wall 11. As shown in FIG. 1B, the side case 5 is attached to the vehicle body 81 such that the inner wall 7 faces the left side portion of the rear portion of the vehicle body 81. The inner wall 7 is a specific example of a "side portion of the side case that faces the vehicle body".

As shown in FIG. 1B, the grip portion 14 is provided at a central portion of an upper portion of the side case 5. The grip portion 14 is a portion that is gripped by a users hand when the side case 5 is to be attached to or detached from the vehicle body 81, when the side case 5 is to be carried, or the like. The grip portion 14 is rotatably attached to the upper wall 8 of the side case 5, and can be inclined as indicated by an arrow D in FIG. 2.

FIGS. 3A and 3B show a state where a center of gravity G of the side case 5 is positioned directly below a central portion H of the grip portion 14. When the user grips the grip portion 14 and lifts the side case 5, the center of gravity G of the side case 5 is positioned directly below the central portion H of the grip portion 14.

As shown in FIG. 3B, the front attachment portion 15 and the rear attachment portion 16 are provided on an upper portion of the inner wall 7 of the case body 6. The front attachment portion 15 and the rear attachment portion 16 have a function of detachably attaching the side case 5 to the case holder 21 fixed to the vehicle body 81. The front attachment portion 15 is disposed forward of a straight line S passing through the central portion H of the grip portion 14 and the center of gravity G of the side case 5. The rear attachment portion 16 is disposed rearward of the straight line S. As shown in FIG. 2, the front attachment portion 15 and the rear attachment portion 16 are each formed in a downward hook shape. That is, the front attachment portion 15 protrudes rightward from the inner wall 7 of the case body 6 (in a direction toward the vehicle body 81), and is bent such that a protruding end faces downward. Similarly, the rear attachment portion 16 also protrudes rightward from the inner wall 7, and is bent such that a protruding end faces downward.

The lower attachment portion 17 is provided on a lower portion of a front portion of the case body 6. The lower attachment portion 17 has a function of detachably attaching the side case 5 to the lower hooking portion 41 fixed to the vehicle body 81. The lower attachment portion 17 protrudes substantially forward from the lower portion of the front portion of the case body 6. In the present embodiment, the lower attachment portion 17 protrudes forward, while being inclined downward, from a lower right corner portion of the front wall 10 (a lower left corner portion in FIG. 2). As shown in FIG. 2, the lower attachment portion 17 is formed to have a U-shaped cross section. The lower attachment portion 17 is opened forward and upward.

A lower portion of the inner wall 7 of the case body 6 is provided with a protruding portion 18 that gradually protrudes rightward (toward the vehicle body 81) as extending downward. That is, the lower portion of the inner wall 7 is formed with a protruding portion 18 protruding rightward of the upper portion of the inner wall 7, and an upper portion of the protruding portion 18 is formed with a surface inclined downward from the case body 6 toward the vehicle body 81.

(Case Holder)

Figure 4A:
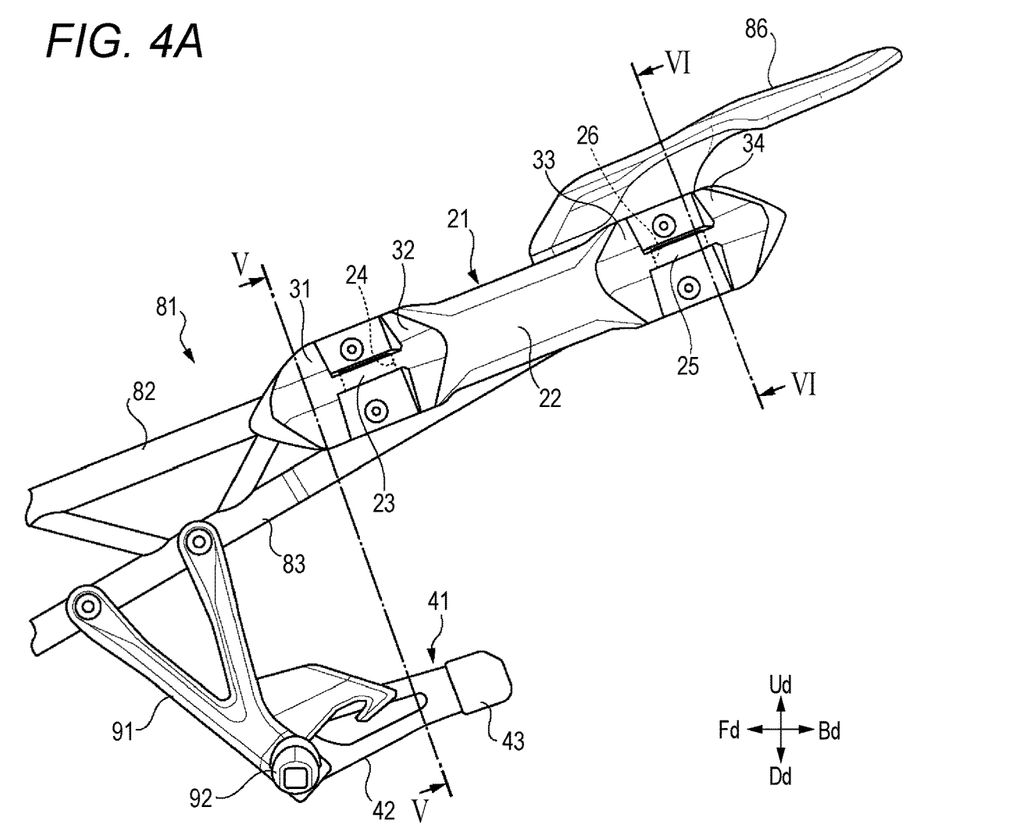
FIG. 4A shows a state of the left rear portion of the vehicle body as viewed the left.
Figure 4B:
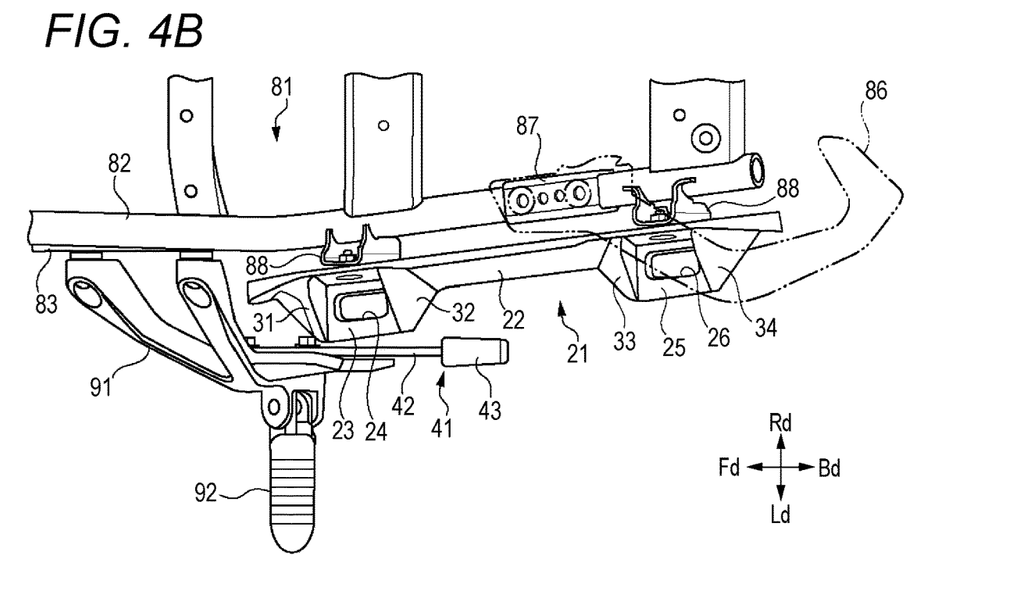
FIG. 4B shows a state of the left rear portion of the vehicle body as viewed from above.
Figure 5:
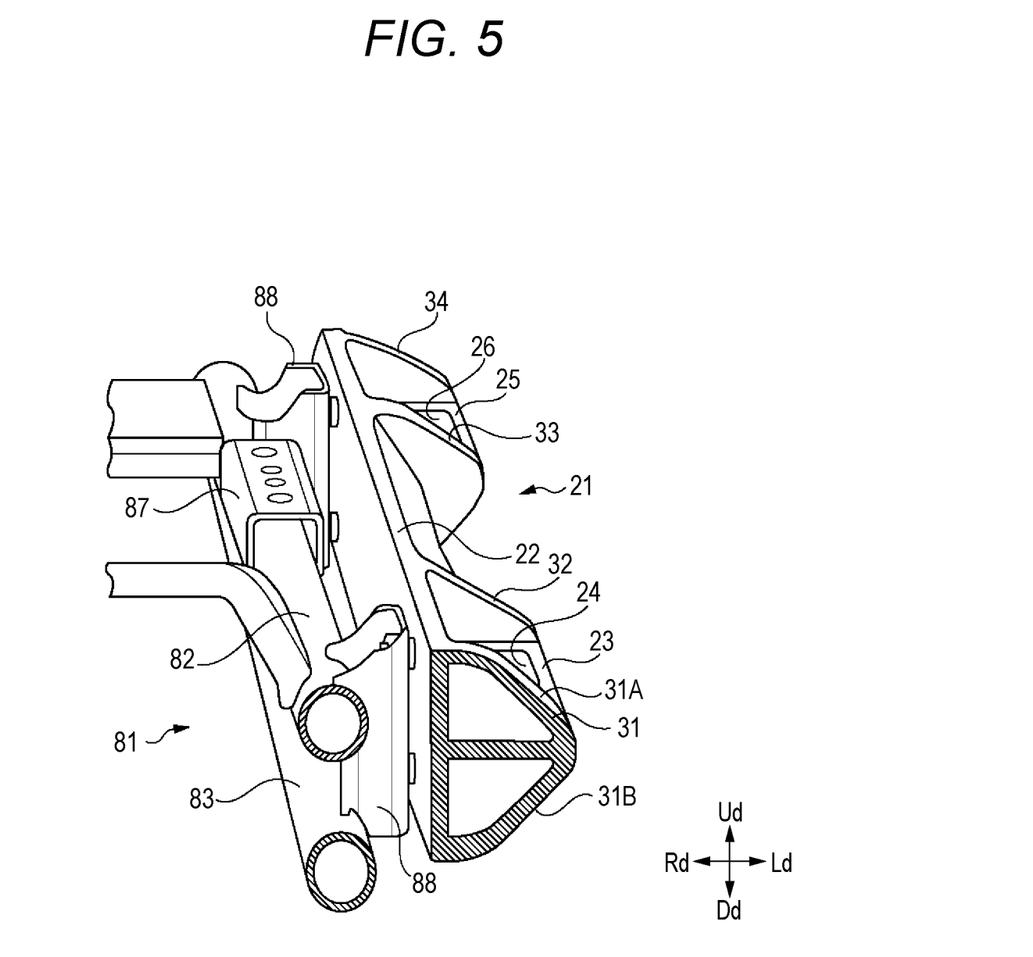
FIG. 5 is an explanatory view showing the left rear portion of the vehicle body cut along a cutting line V-V in FIG. 4A, as viewed from a front upper side thereof.

FIG. 4A shows a left rear portion of the vehicle body 81 as viewed from the left. FIG. 4B shows a left rear portion of the vehicle body 81 as viewed from above. In FIG. 4B, the grab bar 86 is only shown in outer shape by a two-dot chain line for convenience of illustration. FIG. 5 show the left rear portion of the vehicle body 81 (only an upper side) cut along a cutting line V-V in FIG. 4A, as viewed from a front upper side thereof.

The saddle-type vehicle of the present embodiment is a motorcycle of, for example, naked type, sports type, adventure type, or tour type. As shown in FIG. 1B, the rear portion of the vehicle body 81 thereof is provided with four seat rails (the upper left seat rail 82, the lower left seat rail 83, an upper right seat rail 84, and a lower right seat rail 85) extending rearward while being inclined upward from an intermediate portion of the vehicle body 81 in the front-rear direction. Although not shown, a rear end of the lower left seat rail 83 is connected to a rear end of the upper left seat rail 82. A rear end of the lower right seat rail 85 is connected to a rear end of the upper right seat rail 84. The grab bar 86, as a rear mounting component, is mounted to upper portions of rear end side portions of the upper left seat rail 82 and the upper right seat rail 84 via a grab bar mounting member 87.

As shown in FIGS. 4A and 4B, the case holder 21 is provided on the left side portion of the rear portion of the vehicle body 81, specifically, on left portions of rear portions of the upper left seat rail 82 and the lower left seat rail 83. The case holder 21 has a function of allowing the side case 5 to be attached to and detached from the vehicle body 81 and holding the side case 5 on the vehicle body 81. The case holder 21 is formed of, for example, a resin material or a metal material. The case holder 21 includes a base portion 22, the front hooking portion 23, the rear hooking portion 25, and guide portions 31 to 34.

The base portion 22 is formed in a plate shape that extends in the front-rear direction and the up-down direction and is longer in the front-rear direction than in the up-down direction. The base portion 22 is disposed along the extending direction of the upper left seat rail 82. The base portion 22 is fixed to the upper left seat rail 82 and the lower left seat rail 83 by two coupling members 88. That is, the coupling members 88 are joined to the upper left seat rail 82 and the lower left seat rail 83 by welding, for example, and the front portion and the rear portion of the base portion 22 are joined to the two coupling members 88 by fixing members such as bolts, for example.

The front hooking portion 23 is a portion hooked to the front attachment portion 15 of the side case 5. The front hooking portion 23 is formed in a plate shape protruding leftward from a front portion of the base portion 22 (in a direction away from the vehicle body 81). A central portion of the front hooking portion 23 is provided with an insertion hole 24 penetrating the central portion in the upper-lower direction. The insertion hole 24 is a hole inserted with the protruding end of the front attachment portion 15 of the side case 5.

The rear hooking portion 25 is a portion hooked to the rear attachment portion 16 of the side case 5. The front hooking portion 25 is formed in a plate shape protruding leftward from a rear portion of the base portion 22 (in a direction away from the vehicle body 81). A central portion of the rear hooking portion 25 is provided with an insertion hole 26 penetrating the central portion in the upper-lower direction. The insertion hole 26 is a hole inserted with the protruding end of the rear attachment portion 16 of the side case 5.

As shown in FIG. 4A, the guide portion 31 is disposed forward of the front hooking portion 23 and is adjacent to the front hooking portion 23. As shown in FIG. 4B, the guide portion 31 protrudes leftward from the base portion 22 (in a direction away from the vehicle body 81). Further, as shown in FIG. 5, an upper portion of the guide portion 31 protrudes above the front hooking portion 23, and a lower portion of the guide portion 31 protrudes below the front hooking portion 23. The guide portion 31 has an upper surface 31A inclined to be lowered toward the left side. The guide portion 31 has a lower surface 31B inclined to be raised toward the left side. The guide portion 32 is disposed rearward of the front hooking portion 23 and is adjacent to the front hooking portion 23. The guide portion 32 is substantially symmetrical to the guide portion 31 in the front-rear direction. The guide portion 33 is disposed forward of the rear hooking portion 25 and is adjacent to the rear hooking portion 25. The guide portion 33 has substantially the same shape as the guide portion 31. The guide portion 34 is disposed behind the rear hooking portion 25 and is adjacent to the rear hooking portion 25. The guide portion 34 has substantially the same shape as the guide portion 32.

The guide portions 31 to 34 have several functions as described below. (a) When the front attachment portion 15 of the side case 5 is hooked on the front hooking portion 23 of the case holder 21 at the time of mounting the side case 5 to the vehicle body 81, the upper portion of the guide portion 31 and the upper portion of the guide portion 32 guide the protruding end of the front attachment portion 15 into the insertion hole 24 of the front hooking portion 23. Similarly, when the rear attachment portion 16 of the side case 5 is hooked on the rear hooking portion 25 of the case holder 21 at the time of mounting the side case 5 to the vehicle body 81, the upper portion of the guide portion 33 and the upper portion of the guide portion 34 guide the protruding end of the rear attachment portion 16 into the insertion hole 26 of the rear hooking portion 25. (b) Upon detachment of the side case 5 from the vehicle body 81, when the user grips the grip portion 14 and pulls up the side case 5 forward and upward with respect to the vehicle body 81 so as to detach the rear attachment portion 16 from the rear hooking portion 25, the upper portion of the guide portion 33 restricts forward movement of the side case 5 by coming into contact with the rear attachment portion 16. (c) Upon detachment of the side case 5 from the vehicle body 81, when the user holds the grip portion 14 and pulls up the side case 5 forward and upward with respect to the vehicle body 81 so as to detach the front attachment portion 15, the rear attachment portion 16, and the lower attachment portion 17 from the front hooking portion 23, the rear hooking portion 25, and the lower hooking portion 41, respectively, the lower portion of the guide portion 31 and the lower portion of the guide portion 32 press the protruding portion 18 of the side case 5 and move the side case 5 leftward (in a direction away from the vehicle body 81). (d) The guide portion 31 and the guide portion 32 reinforce the front hooking portion 23, and the guide portion 33 and the guide portion 34 reinforce the rear hooking portion 25.

The upper portion of the guide portion 33 is a specific example of a "movement restricting portion". The lower portion of the guide portion 31 or the lower portion of the guide portion 32 is a specific example of a "projection".

(Positions of Case Holder and Grab Bar)

Figure 6A:
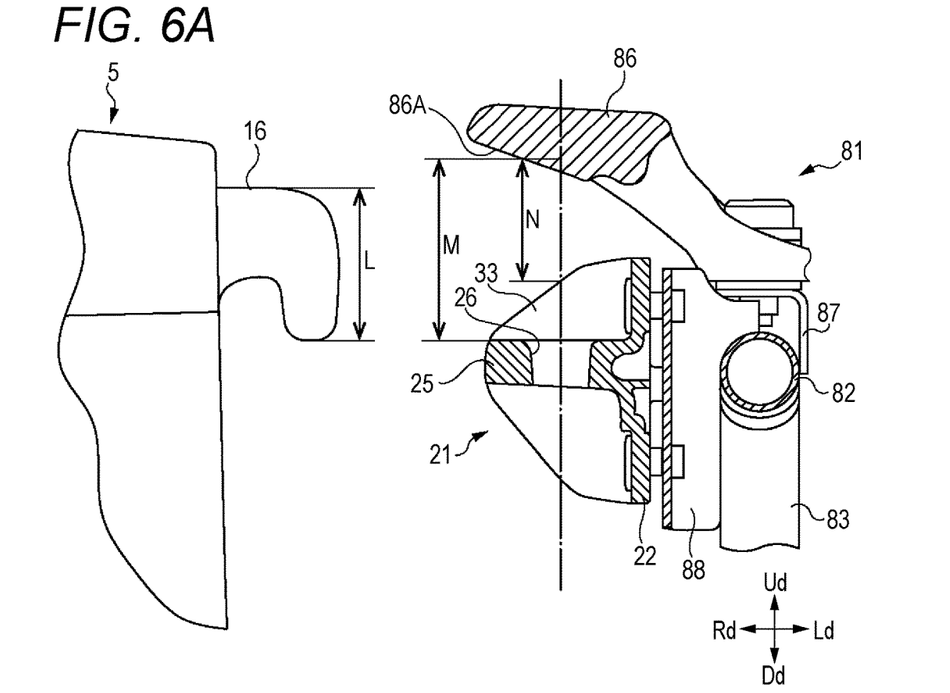
FIG. 6A shows a state where the rear attachment portion is not hooked on a rear hooking portion.
Figure 6B:
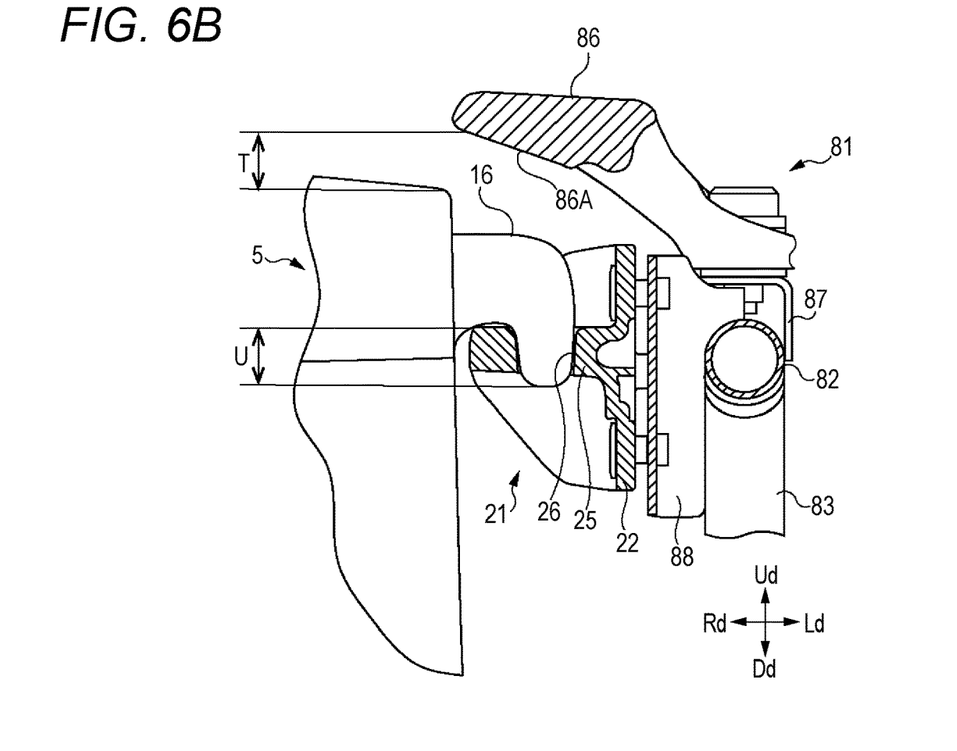
FIG. 6B shows a state where the rear attachment portion is hooked on the rear hooking portion.

FIGS. 6A and 6B show a cross section of the left rear portion of the vehicle body 81 cut along a cutting line VI-VI in FIG. 4A and a state of the rear attachment portion 16 of the side case 5 as viewed from the rear. FIG. 6A shows a state where the rear attachment portion 16 is not hooked on the rear hooking portion 25, and FIG. 6B shows a state where the rear attachment portion 16 is hooked on the rear hooking portion 25.

As shown in FIG. 6A, a left portion of the grab bar 86 projects leftward from the vehicle body 81 and is positioned above the rear hooking portion 25 of the case holder 21. The grab bar 86 has a lower surface 86A of a portion positioned above the rear hooking portion 25 that is inclined in a manner lowered as approaching the vehicle body 81. An interval M in the up-down direction between the portion of the grab bar 86 located above the rear hooking portion 25 and the rear hooking portion 25 is larger than a dimension L in the up-down direction of the rear attachment portion 16 of the side case 5. As shown in FIG. 6A, when the vehicle body 81 is viewed from the rear, an interval N in the up-down direction between the portion of the grab bar 86 located above the rear hooking portion 25 and the guide portion 33 is smaller than the dimension L in the up-down direction of the rear attachment portion 16 of the side case 5.

As shown in FIG. 6B, when the side case 5 is attached to the vehicle body 81, an interval T between a portion of the side case 5 where the rear attachment portion 16 is provided and the left portion of the grab bar 86 located above the rear attachment portion 16 is, for example, slightly larger than a length U of a portion of the protruding end of the rear attachment portion 16 that enters the insertion hole 26 of the rear hooking portion 25.

(Lower Hooking Portion)

As shown in FIGS. 1A and 1B, the pinion step holder 91 extends leftward and downward from a front portion of the lower left seat rail 83. A left portion of a lower end side of the pinion step holder 91 is provided with a pinion step 92. A front side portion of the lower right seat rail 85 is also provided with a pinion step holder and a pinion step that are bilaterally symmetrical to the pinion step holder 91 and the pinion step 92, but illustration thereof is omitted.

As shown in FIGS. 4A and 4B, the lower hooking portion 41 is provided at a front lower side portion of the portion where the case holder 21 is provided at the left side portion of the rear portion of the vehicle body 81, specifically, at the lower end side of the pinion step holder 91. The lower hooking portion 41 protrudes substantially rearward from the lower end side of the pinion step holder 91. The lower hooking portion 41 is hooked to the lower attachment portion 17 of the side case 5. The lower hooking portion 41 has a function of cooperating with the case holder 21 to enable attachment to and detachment from the vehicle body 81 of the side case 5 and holding the side case 5 on the vehicle body 81.

The lower hooking portion 41 includes a long plate-shaped plate 42 formed of, for example, a metal material, and an elastic body 43 (for example, a rubber cap) mounted on a rear end (tip end) of the plate 42. A front end (base end) of the plate 42 is fixed, by a fixing member such as a bolt, to a right portion of the lower end side of the pinion step holder 91, that is, a portion opposite to the side where the pinion step 92 is provided.

As shown in FIG. 2, the lower attachment portion 17 of the side case 5 has a U-shaped cross section, and is opened forward and downward. The lower attachment portion 17 is hooked on the lower hooking portion 41 by bilaterally sandwiching the elastic body 43 of the lower hooking portion 41 from above.

(Attachment of Side Case)

Figure 7:
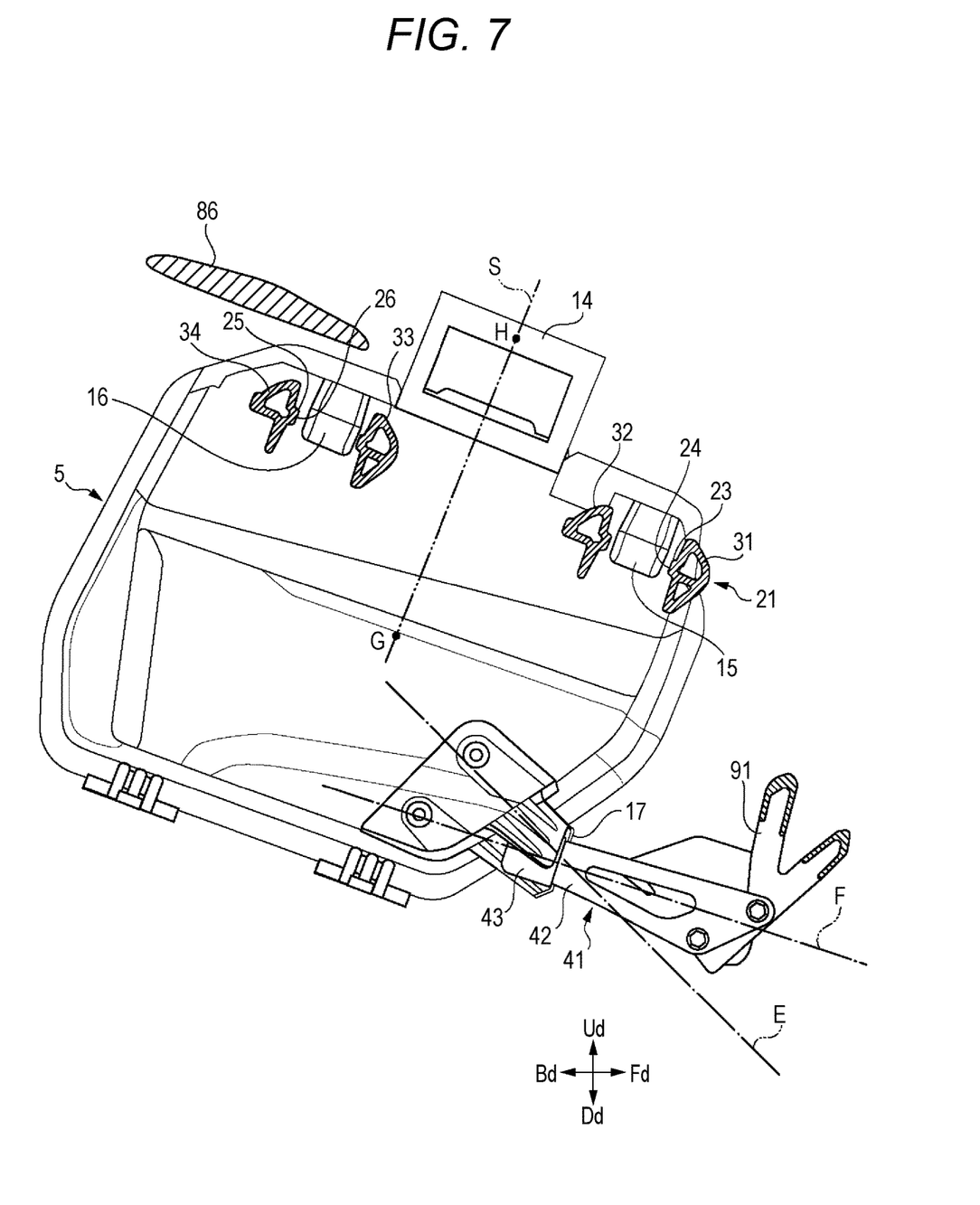
FIG. 7 is an explanatory view showing a cross section of the vehicle body and the side case attached to the vehicle body according to the embodiment of the present invention cut along a cutting line VII-VII in FIG. 1B, as viewed from the right.

FIG. 7 is an explanatory view showing a cross section of the vehicle body 81 and the side case 5 attached to the vehicle body 81 cut along a cutting line VII-VII in FIG. 1B, as viewed from the right. As shown in FIG. 7, the front attachment portion 15 is hooked on the front hooking portion 23 of the case holder 21 from above, the rear attachment portion 16 is hooked on the rear hooking portion 25 of the case holder 21 from above, and the lower attachment portion 17 is hooked on the lower hooking portion 41 from above, so that the side case 5 is attached to and held by the vehicle body 81. The side case 5 is held by the vehicle body 81 in a state where the side case 5 is inclined such that the central portion H of the grip portion 14 is positioned forward of the center of gravity G of the side case 5. Although not shown in the drawings, the side case 5 is provided with a lock mechanism that maintains a state where the front attachment portion 15 and the rear attachment portion 16 are hooked on the front hooking portion 23 and the rear hooking portion 25. The lock mechanism maintains the inclined state such that the central portion H of the grip portion 14 is positioned forward of the center of gravity G of the side case 5.

(Rearward Rotation Upon Detachment of Side Case)

Figure 8A:
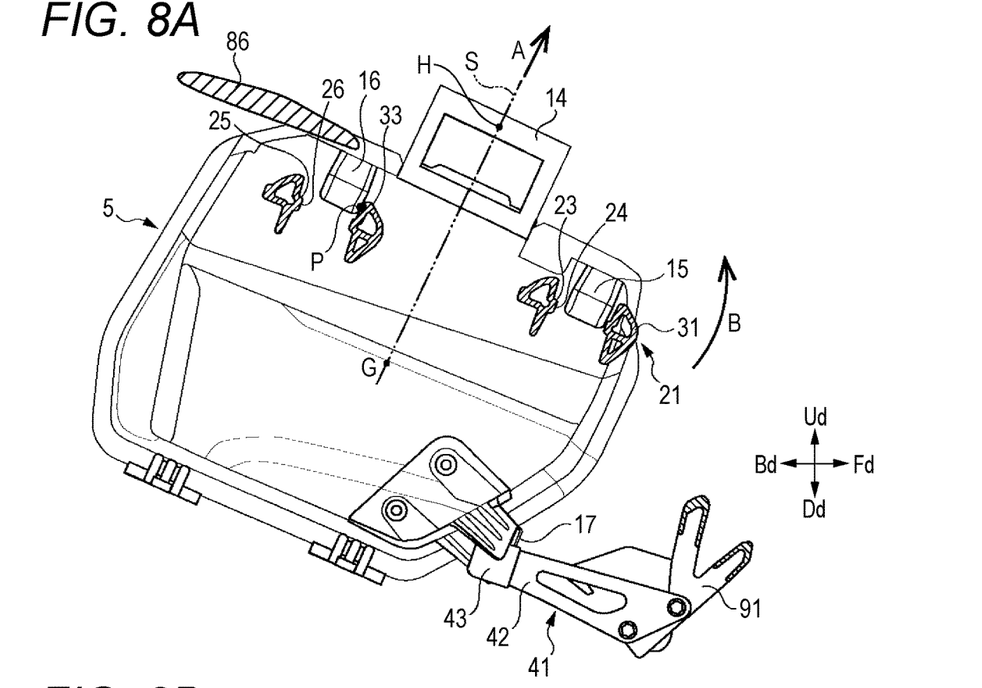
FIGS. 8A and 8B are an explanatory view showing movement of the side case of the embodiment of the present invention upon detachment of the side case from the vehicle body, as viewed from the same direction as in FIG. 7.
Figure 8B:
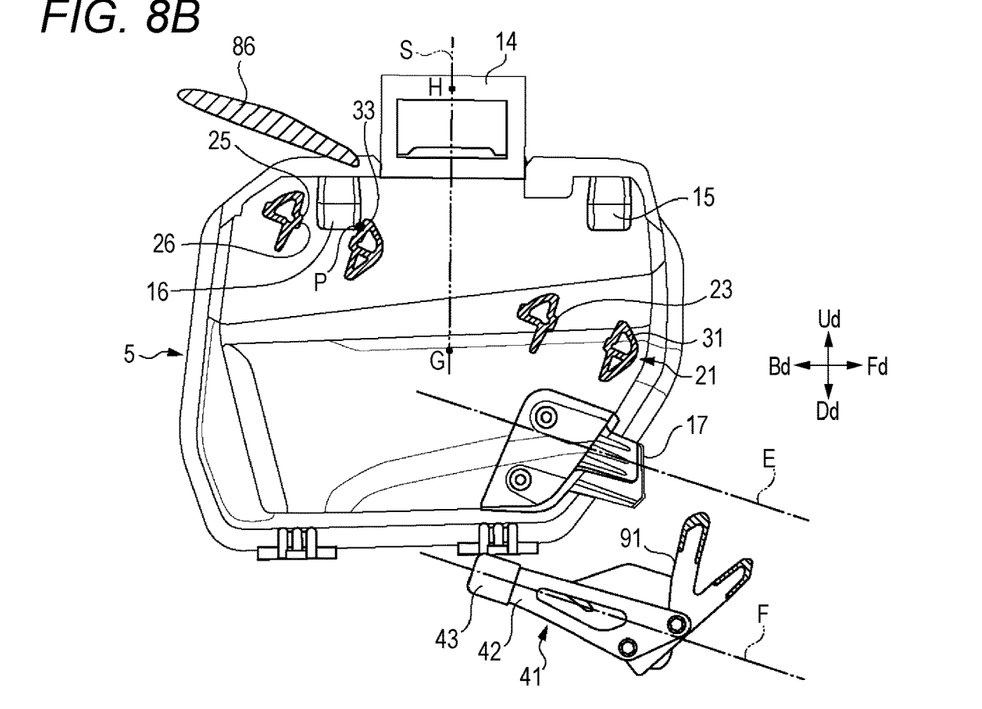

FIGS. 8A and 8B show movement of the side case 5 upon detachment of the side case 5 from the vehicle body 81 as viewed from the same direction as in FIG. 7. In FIG. 8A, when the side case 5 attached to the vehicle body 81 is to be detached from the vehicle body 81, the user first releases the lock mechanism, grips the grip portion 14 by hand, and pulls up the side case 5 forward and upward (in the direction of an arrow A). As a result, the side case 5 moves forward and upward against gravity, the rear attachment portion 16 is detached from the rear hooking portion 25, and immediately thereafter, the rear attachment portion 16 comes into contact with the upper portion of the guide portion 33. P in FIG. 8A indicates a contact point between the rear attachment portion 16 and the upper portion of the guide portion 33 at this time.

At this time, the front attachment portion 15 may or may not be detached from the front hooking portion 23 due to a slight difference in an angle at which the user pulls up the side case 5 forward and upward. Similarly, the lower attachment portion 17 also may or may not be detached from the lower hooking portion 41. FIG. 8A shows a case where the front attachment portion 15 and the lower attachment portion 17 are not detached from the front hooking portion 23 and the lower hooking portion 41 when the user pulls up the side case 5 forward and upward.

When the user pulls up the side case 5 forward and upward, the rear attachment portion 16 is detached from the rear hooking portion 25, and the rear attachment portion 16 comes into contact with the upper portion of the guide portion 33, a force by which the user pulls the grip portion 14 forward and upward and gravity act on the side case 5. As a result, the side case 5 tends to rotate rearward such that the center of gravity G of the side case 5 becomes located directly below the central portion H of the grip portion 14. At this time, since the rear attachment portion 16 is in contact with the upper portion of the guide portion 33, the forward movement of the side case 5 is restricted by the upper portion of the guide portion 33. As a result, the side case 5 rotates about the contact point P in the direction of an arrow B in FIG. 8A (rotates rearward).

When the side case 5 rotates rearward in this manner, the center of gravity G of the side case 5 comes directly below the central portion H of the grip portion 14 as shown in FIG. 8B. As a result, the front attachment portion 15 is detached from the front hooking portion 23 and is greatly separated upward from the front hooking portion 23. At the same time, the lower attachment portion 17 is detached from the lower hooking portion 41 and is greatly separated upward from the lower hooking portion 41. Immediately thereafter, the user pulls the grip portion 14 leftward. As a result, the rear attachment portion 16 is separated from the upper portion of the guide portion 33, and the side case 5 is separated from the vehicle body 81.

In this way, when the user holds the grip portion 14 and pulls up the side case 5 forward and upward so as to detach the rear attachment portion 16 from the rear hooking portion 25, the side case 5 rotates rearward about the contact point P between the rear attachment portion 16 and the upper portion of the guide portion 33 due to gravity, and the front attachment portion 15 and the lower attachment portion 17 are automatically detached from the front hooking portion 23 and the lower hooking portion 41 and are greatly separated from the front hooking portion 23 and the lower hooking portion 41.

In order to allow the side case 5 to rotate rearward, it is necessary that no objects that come into contact with the side case 5 at the time of rearward rotation of the side case 5 attached to the vehicle body 81 exist above the portion of the side case 5 that is located forward of the guide portion 33. As shown in FIG. 1B, the vehicle body 81 of the present embodiment is provided with the grab bar 86 as a rear mounting component at the upper portions of the rear end side portions of the upper left seat rail 82 and the upper right seat rail 84, and the left portion of the grab bar 86 projects leftward from the upper left seat rail 82 and the upper right seat rail 84 and is positioned above the side case 5 attached to the vehicle body 81. However, the left portion of the grab bar 86 is not located above the portion of the side case 5 attached to the vehicle body 81 that is located forward of the guide portion 33. That is, when the vehicle body 81 is viewed from above, the grab bar 86 does not overlap with the portion of the side case 5 attached to the vehicle body 81 that is located forward of the guide portion 33.

(Lateral Movement Upon Detachment of Side Case)

Figure 9A:
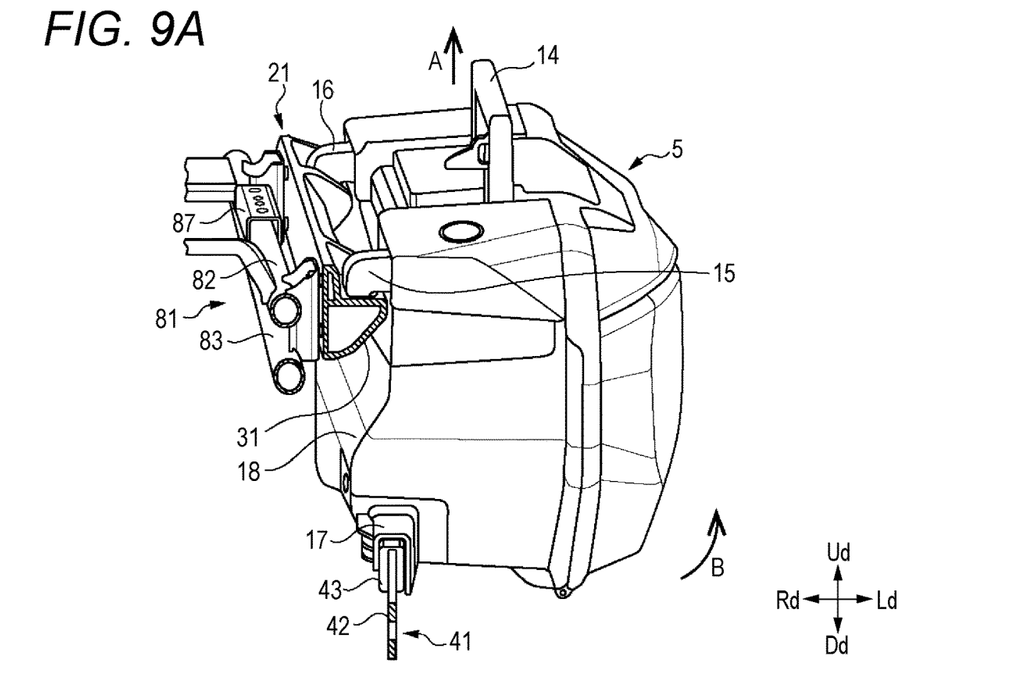
FIGS. 9A and 9B are an explanatory view showing movement of the side case of the embodiment of the present invention upon detachment of the side case from the vehicle body, as viewed from the front.
Figure 9B:
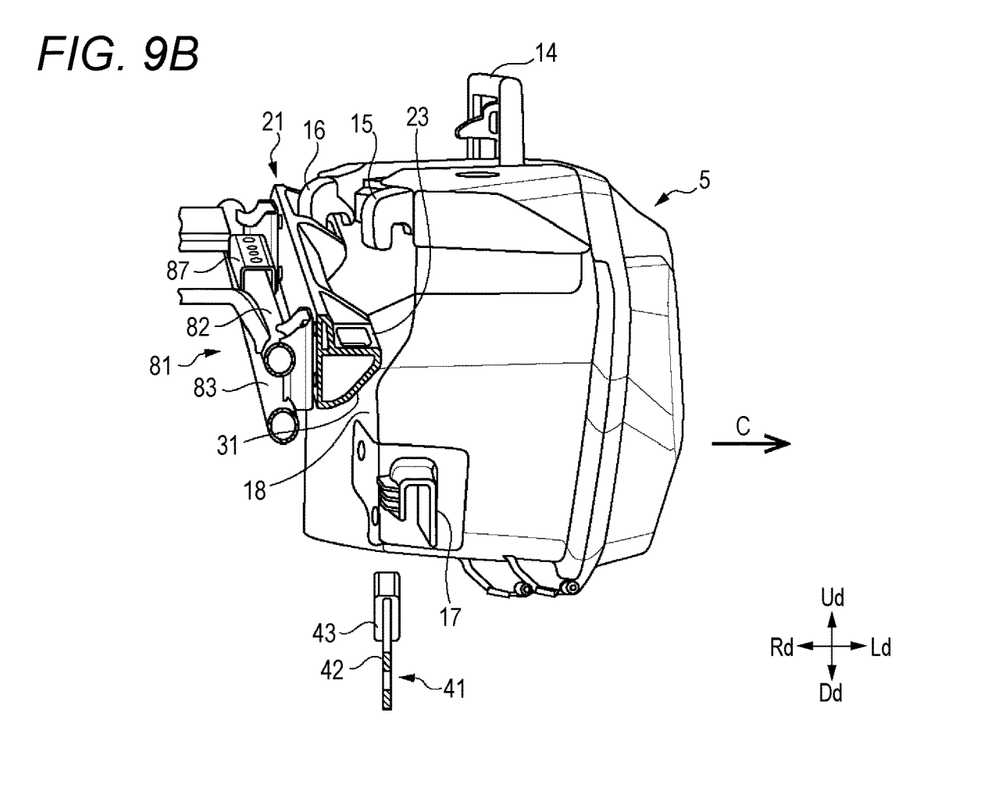

FIGS. 9A and 9B show movement of the side case 5 upon detachment of the side case 5 from the vehicle body 81 as viewed from the front. In FIG. 9A, after the user releases the lock mechanism, the user grips the grip portion 14 by hand and pulls up the side case 5 forward and upward (in the direction of an arrow A) so as to detach the rear attachment portion 16 from the rear hooking portion 25, the rear attachment portion 16 comes into contact with the upper portion of the guide portion 33, and the side case 5 rotates rearward in the direction of the arrow B around the contact point between the rear attachment portion 16 and the upper portion of the guide portion 33 due to gravity.

During the rearward rotation of the side case 5, after the front attachment portion 15 and the lower attachment portion 17 are detached from the front hooking portion 23 and the lower hooking portion 41, the lower portion of the guide portion 31 and the lower portion of the guide portion 32 of the case holder 21 come into contact with the protruding portion 18 of the side case 5 and press the protruding portion 18 leftward. As a result, the side case 5 is moved leftward (in a direction of an arrow C) and is separated from the vehicle body 81.

(Arrangement of Lower Attachment Portion and Lower Hooking Portion)

As shown in FIG. 7, in a state where the side case 5 is held attached to the vehicle body 81 via the case holder 21 and the lower hooking portion 41 such that the grip portion 14 is located forward of the center of gravity G of the side case 5, the lower attachment portion 17 projects from a rear upper side of the lower hooking portion 41 toward the lower hooking portion 41, and a straight line E along a projecting direction of the lower attachment portion 17 and a straight line F along a projecting direction of the lower hooking portion 41 intersect with each other when the vehicle body 81 is viewed from a lateral side.

As shown in FIG. 8B, the user grips the grip portion 14 and pulls the side case 5 attached to the vehicle body 81 forward and upward with respect to the vehicle body 81 so as to detach the rear attachment portion 16 from the rear hooking portion 25, the side case 5 is rotated rearward due to gravity, the front attachment portion 15 and the lower attachment portion 17 are detached from the front hooking portion 23 and the lower hooking portion 41, and the center of gravity G of the side case 5 reaches a position directly below the central portion H of the grip portion 14. In this state, the straight line E along the projecting direction of the lower attachment portion 17 and the straight line F along the projecting direction of the lower hooking portion 41 are parallel to each other when the vehicle body 81 is viewed from the lateral side.

An attachment angle of the lower attachment portion 17 of the side case 5 and an attachment angle of the lower hooking portion 41 of the pinion step holder 91 are set such that, as described above, the straight lines E and F intersect with each other when the side case 5 is held in the forward inclined state by the vehicle body 81, and the straight lines E and F are parallel to each other when the side case 5 rotates rearward upon detachment of the side case 5 and the center of gravity G thereof comes directly below the central portion H of the grip portion 14.

As described above, the side case attachment structure 1 of the embodiment of the present invention includes the case holder 21 that has the front attachment portion 15 and the rear attachment portion 16 respectively hooked on the front hooking portion 23 and the rear hooking portion 25 from above, so as to hold the side case 5 on the vehicle body 81 in a state where the side case 5 is inclined such that the central portion H of the grip portion 14 is positioned forward of the center of gravity G of the side case 5. The part of the case holder 21 that is forward of the rear hooking portion 25 is provided with the guide portion 33 protruding above the rear hooking portion 25. The guide portion 33 has a function of restricting the forward movement of the side case 5 attached to the vehicle body 81 by coming into contact with the rear attachment portion 16 when the grip portion 14 is gripped and the side case 5 is pulled forward and upward with respect to the vehicle body 81 so as to detach the rear attachment portion 16 from the rear hooking portion 25. With these configurations, when the user holds the grip portion 14 and pulls up the side case 5 forward and upward so as to detach the rear attachment portion 16 from the rear hooking portion 25 so as to detach the side case 5 from the vehicle body 81, and the side case 5 can rotate rearward about the contact point P between the rear attachment portion 16 and the upper portion of the guide portion 33 due to gravity. Using such rearward rotation, the front attachment portion 15 and the lower attachment portion 17 can be automatically detached from the front hooking portion 23 and the lower hooking portion 41. Therefore, the user can easily detach the side case 5 from the vehicle body 81.

In the present embodiment, as shown in FIG. 6B, the left portion of the grab bar 86 projects leftward from the vehicle body 81 and is located above the portion of the side case 5 attached to the vehicle body 81 where the rear attachment portion 16 is provided. In addition, the vertical interval T between the portion of the side case 5 attached to the vehicle body 81 where the rear attachment portion 16 is provided and the left portion of the grab bar 86 is extremely small. Specifically, the size of the interval T is, for example, slightly larger than the length U of the portion of the protruding end of the rear attachment portion 16 that is inserted into the insertion hole 26 of the rear hooking portion 25. As a result, when the side case 5 is to be detached from the vehicle body 81, the amount by which the entire side case 5 can be moved upward is a small amount equal to or less than the size of the interval T.

According to the side case attachment structure 1 of the present embodiment, however, when the side case 5 is to be detached from the vehicle body 81, the side case 5 rotates rearward about the contact point P between the rear attachment portion 16 and the upper portion of the guide portion 33 due to gravity, whereby the front attachment portion 15 and the lower attachment portion 17 are detached from the front hooking portion 23 and the lower hooking portion 41. Therefore, the user can detach the rear attachment portion 16 from the rear hooking portion 25 and detach the side case 5 from the vehicle body 81 by simply moving the entire side case 5 upward by an amount equal to or less than the interval T.

As described above, according to the present embodiment, it is possible to easily detach the side case 5 from the vehicle body, even in a case where the left portion of the grab bar 86 projects leftward from the vehicle body 81 and is located above the portion of the side case 5 held by the vehicle body 81 where the rear attachment portion 16 is provided, which limits the amount of upward movement of the entire side case 5 when the side case 5 is to be detached from the vehicle body 81.

Further, in the side case attachment structure 1 of the present embodiment, the side case 5 is provided with the protruding portion 18, and the case holder 21 is provided with the guide portion 31 and the guide portion 32. Upon detachment of the side case 5 from the vehicle body 81, when the front attachment portion 15, the rear attachment portion 16, and the lower attachment portion 17 are detached from the front hooking portion 23, the rear hooking portion 25, and the lower hooking portion 41, respectively, the guide portion 31 and the guide portion 32 press the protruding portion 18 and move the side case 5 leftward away from the vehicle body 81. Accordingly, upon detachment of the side case 5, the side case 5 automatically moves in the direction away from the vehicle body 81, and thus the user can more easily detach the side case 5 from the vehicle body 81.

In the side case attachment structure 1 of the present embodiment, the attachment angle of the lower attachment portion 17 of the side case 5 and the attachment angle of the lower hooking portion 41 of the pinion step holder 91 are set such that the straight line E along the projecting direction of the lower attachment portion 17 and the straight line F along the projecting direction of the lower hooking portion 41 intersect with each other as shown in FIG. 7 when the side case 5 is held in the forward inclined state by the vehicle body 81, and the straight lines E and F are parallel to each other as shown in FIG. 8B when the side case 5 rotates rearward upon detachment of the side case 5 and the center of gravity G thereof comes directly below the central portion H of the grip portion 14. According to this configuration, the lower attachment portion 17 can be greatly separated from the lower hooking portion 41 upon detachment of the side case 5 from the vehicle body 81. Therefore, when the user separates the side case 5 from the vehicle body 81 after the front attachment portion 15, the rear attachment portion 16, and the lower attachment portion 17 are separated from the front hooking portion 23, the rear hooking portion 25, and the lower hooking portion 41, respectively, the lower attachment portion 17 can be prevented from coming into contact with the lower hooking portion 41. Therefore, the user can smoothly detach the side case 5 from the vehicle body 81.

The grab bar 86 does not overlap with the portion of the side case 5 attached to the vehicle body 81 that is located forward of the guide portion 33. As a result, the rearward rotation of the side case 5 can be prevented from being hindered by the grab bar 86 upon detachment of the side case 5 from the vehicle body 81.

The grab bar 86 has the lower surface 86A of the portion positioned above the rear hooking portion 25 that is inclined in a manner lowered as approaching the vehicle body 81. Thus, the rear attachment portion 16 can be smoothly guided to the rear hooking portion 25 upon attachment of the side case 5 to the vehicle body 81. Further, the rear attachment portion 16 can be smoothly guided away from the rear hooking portion 25 upon detachment of the side case 5 from the vehicle body 81.

When the vehicle body 81 is viewed from the rear, an interval N in the up-down direction between the portion of the grab bar 86 located above the rear hooking portion 25 and the guide portion 33 is smaller than the dimension L in the up-down direction of the rear attachment portion 16 of the side case 5. Thus, upon detachment of the side case 5 from the vehicle body 81, when the user grips the grip portion 14 and pulls up the side case 5 forward and upward with respect to the vehicle body 81 so as to detach the rear attachment portion 16 from the rear hooking portion 25, the rear attachment portion 16 can securely contact the upper portion of the guide portion 33, and thus the guide portion 33 can securely restrict forward movement of the side case 5.

In the above embodiment, the shape of the rear attachment portion 16 is set to a shape protruding from the inner wall 7 of the case body 6 toward the vehicle body 81 and bent such that a protruding end faces downward. The shape of the rear attachment portion 16, however, may be a shape protruding from the inner wall 7 of the case body 6 toward the vehicle body 81 and inclined such that the protruding end faces downward. The same applies to the shape of the front attachment portion 15. In the above embodiment, the rear hooking portion 25 is provided with the insertion hole 26 inserted with the protruding end of the rear attachment portion 16, but may also be provided with a groove or a recess instead of the insertion hole 26. The same applies to the front hooking portion. In addition, the shape of the lower attachment portion 17 or the lower hooking portion 41 is not limited to that of the above embodiment.

In the above embodiment, the grab bar 86 is taken as an example of the rear mounting component, but a rear carrier, a rear case, and the like are also conceivable as the rear mounting component.

In the above embodiment, the side case attachment structure 1 for attaching the side case to the left side of the rear portion of the vehicle body 81 of the saddle-type vehicle is described as an example, but the present invention can also be applied to a side case attachment structure for attaching the side case to the right side of the rear portion of the vehicle body 81 of the saddle-type vehicle. In this case, a side case attachment structure that is bilaterally symmetrical to the side case attachment structure 1 of the above-described embodiment may be formed. The present invention is not limited to a motorcycle of naked type, sports type, adventure type, or tour type, and can be applied to various saddle-type vehicles such as scooters, motorized tricycles, and the like.

The present invention can be modified as appropriate without departing from the scope or spirit of the invention which can be read from the claims and the entire description, and a side case attachment structure accompanying such a change is also included in the technical concept of the present invention.

What is claimed is:

1. A side case attachment structure configured to detachably attach a side case including a grip portion at an upper portion of the side case to a vehicle body of a saddle-type vehicle, the side case attachment structure comprising:
    a first attachment portion protruding toward the vehicle body from a portion of the side case that is rearward of a straight line passing through the grip portion and a center of gravity of the side case, the first attachment portion being bent or inclined such that a protruding end of the first attachment portion faces downward;
    a second attachment portion protruding toward the vehicle body from a portion of the side case that is forward of the straight line passing through the grip portion and the center of gravity of the side case, the second attachment portion being bent or inclined such that a protruding end of the second attachment portion faces downward; and
    a holding portion provided on a side portion of a rear portion of the vehicle body, the holding portion including a first hooking portion configured to hook the first attachment portion from above and a second hooking portion configured to hook the second attachment portion from above, the holding portion being configured to hold the side case on the vehicle body in a state where the side case is inclined such that the grip portion is positioned forward of the center of gravity of the side case by being configured to hook the first attachment portion and the second attachment portion on the first hooking portion and the second hooking portion, respectively, wherein
    a part of the holding portion that is forward of the first hooking portion is provided with a movement restricting portion protruding above the first hooking portion, the movement restricting portion being configured to restrict forward movement of the side case by coming into contact with the first attachment portion when the grip portion is gripped and the side case held by the vehicle body is pulled forward and upward with respect to the vehicle body so as to detach the first attachment portion from the first hooking portion.

2. The side case attachment structure according to claim 1, wherein
a lower portion of a side portion of the side case faces the vehicle body, the lower portion being provided with a protruding portion that protrudes toward the vehicle body as extending downward,
a front portion of the holding portion is provided with a projection projecting toward the side case, and
when the grip portion is gripped and the side case held by the vehicle body is pulled forward and upward with respect to the vehicle body so as to detach the first attachment portion from the first hooking portion and detach the second attachment portion from the second hooking portion, the projection is configured to push the protruding portion and laterally to move the side case away from the vehicle body.

3. The side case attachment structure according to claim 1, further comprising:
a third attachment portion projecting forward from a lower portion of a front portion of the side case; and
a third hooking portion projecting rearward from a front lower portion of a portion of the side portion of the rear portion of the vehicle body that is provided with the holding portion, the third hooking portion being configured to hook the third attachment portion from above, wherein
in a state where the side case is held by the vehicle body via the holding portion and the third hooking portion such that the grip portion is located forward of the center of gravity of the side case, the third attachment portion projects from a rear upper side of the third hooking portion toward the third hooking portion, and a straight line along a projecting direction of the third attachment portion and a straight line along a projecting direction of the third hooking portion intersect with each other when the vehicle body is viewed from a lateral side.

4. The side case attachment structure according to claim 3, wherein
in a state where the grip portion is gripped and the side case held by the vehicle body is pulled forward and upward with respect to the vehicle body so as to detach the first attachment portion from the first hooking portion, and then the side case is rotated rearward and the center of gravity of the side case reaches a position directly below the grip portion, the straight line along the projecting direction of the third attachment portion and the straight line along the projecting direction of the third hooking portion are parallel to each other when the vehicle body is viewed from the lateral side.

5. The side case attachment structure according to claim 1, wherein
a rear mounting component is attached to an upper portion of the rear portion of the vehicle body and disposed at a position higher than the side case held by the vehicle body, the rear mounting component is disposed such as not overlapping with a portion of the side case held by the vehicle body that is located forward of the movement restricting portion when the vehicle body is viewed from above.

6. The side case attachment structure according to claim 5, wherein
the rear mounting component laterally protrudes from the vehicle body and is positioned above the first hooking portion, and
a lower surface of a portion of the rear mounting component that is located above the first hooking portion is inclined such as not being lower as approaching the vehicle body.

7. The side case attachment structure according to claim 6, wherein
when the vehicle body is viewed from the rear, an interval in an upper-lower direction between the portion of the rear mounting component that is located above the first hooking portion and the movement restricting portion is smaller than a dimension in the upper-lower direction of the first attachment portion.

* * * * *